(12) United States Patent
Valliere et al.

(10) Patent No.: US 6,722,682 B2
(45) Date of Patent: Apr. 20, 2004

(54) TRAILER HITCH WITH LOAD ADJUSTMENT

(75) Inventors: Michael A. Valliere, Huntsville (CA); Michael Kutzscher, Huntsville (CA); Allan C. Schnurr, Huntsville (CA)

(73) Assignee: Cequent Towing Products, Inc., Goshen, IN (US)

( * ) Notice: Subject to any disclaimer, the term of this patent is extended or adjusted under 35 U.S.C. 154(b) by 0 days.

(21) Appl. No.: 09/947,951

(22) Filed: Sep. 6, 2001

(65) Prior Publication Data

US 2003/0042703 A1 Mar. 6, 2003

(51) Int. Cl.$^7$ ............................................. B62D 53/00
(52) U.S. Cl. ................ 280/405.1; 280/406.1; 280/406.2; 280/455.1; 280/456.1
(58) Field of Search ............................ 280/405.1, 406.1, 280/406.2, 407, 455.1, 456.1, 483, 484

(56) References Cited

U.S. PATENT DOCUMENTS

| | | |
|---|---|---|
| 2,789,834 A | 4/1957 | Chism |
| 2,847,232 A | 8/1958 | Graham |
| 3,151,879 A | 10/1964 | Bock |
| 3,194,584 A | 7/1965 | Reese |
| D213,616 S | 3/1969 | Bock et al. |
| 3,490,788 A | 1/1970 | Mann |
| 3,497,240 A | 2/1970 | Harms et al. |
| 3,567,251 A | 3/1971 | Dalton |
| 3,655,221 A | 4/1972 | Warner |
| 3,660,004 A | 5/1972 | Newkirk |
| 3,679,232 A | 7/1972 | Weber |
| 3,731,950 A | 5/1973 | Burcham |
| 3,778,088 A | 12/1973 | Alexander |
| 3,843,163 A | 10/1974 | Hale |
| 4,033,601 A | 7/1977 | Lindahl et al. |
| 4,049,288 A | 9/1977 | Young |
| 4,053,174 A | 10/1977 | Guettler, Jr. |
| 4,213,627 A | 7/1980 | Thompson |
| 4,662,647 A | 5/1987 | Calvert |
| 4,792,151 A | 12/1988 | Feld |
| 4,815,752 A | 3/1989 | Young et al. |
| 5,161,815 A | 11/1992 | Penor, Jr. |
| 5,358,269 A | 10/1994 | Jakeman et al. |
| 5,363,924 A | 11/1994 | Foley et al. |
| 5,375,867 A | 12/1994 | Kass et al. |
| 5,413,366 A | 5/1995 | Gibbons |
| 5,465,991 A | 11/1995 | Kass et al. |
| 5,562,298 A | 10/1996 | Kass et al. |
| 5,580,076 A | 12/1996 | DeRoule et al. |
| 5,628,525 A | 5/1997 | Kass et al. |
| 5,647,603 A | 7/1997 | Kass et al. |
| 5,799,965 A | 9/1998 | Kass et al. |
| 5,823,558 A | 10/1998 | Shoquist |
| 5,868,414 A | 2/1999 | McCoy et al. |
| 5,873,594 A | 2/1999 | McCoy et al. |
| 5,890,726 A | 4/1999 | McCoy et al. |
| 5,934,698 A | 8/1999 | Despain |
| 5,984,341 A | 11/1999 | Kass et al. |
| 6,010,142 A | 1/2000 | McCoy et al. |
| 6,045,147 A | 4/2000 | Schmidt et al. |
| 6,126,184 A | 10/2000 | Liao |
| 6,142,500 A | 11/2000 | Sargent |

Primary Examiner—Lesley D. Morris
Assistant Examiner—L. Lum
(74) Attorney, Agent, or Firm—Harness, Dickey & Pierce, PLC

(57) ABSTRACT

A weight distributing hitch system is provided with a shank and a head which is angularly adjustable relative to the shank. The head includes a plurality of adjustment teeth which are engaged by a toothed caster having corresponding teeth. The toothed caster has a mounting hole which is offset relative to a center of the tooth configuration so as to allow the toothed caster to be rotated 180 degrees in order to allow for angular adjustment of the head relative to the shank. In addition, the head is provided with both, mounting holes for receiving round spring bars and receptor grooves on a lower surface of an upper flange for receiving a trunnion-type spring bar.

5 Claims, 5 Drawing Sheets

TRAILER HITCH WITH LOAD ADJUSTMENT

FIELD OF THE INVENTION

The present invention relates to a device for towing a trailer, and more particularly to a weight distribution trailer hitch system.

BACKGROUND AND SUMMARY OF THE INVENTION

When a trailer is hitched to a tow vehicle, the tongue weight typically causes the rear of the tow vehicle to lower, and the front to raise as shown in the prior art FIG. 1. The purposes of a weight distributing hitch is to remove excessive weight from the tow vehicle's rear axle and to distribute it to the front wheels of the tow vehicle and to the trailer wheels. Weight distributing hitch systems of this type are generally known in the art. Despite the generally known technology of weight distributing hitch systems, it is still desirable in the art to provide a weight distribution hitch system which is easier to assemble and properly adjust and which is capable of being utilized with alternative accessories.

Accordingly, the present invention provides a weight distributing hitch system for a trailer including a shank portion and a head which is angularly adjustably mounted to the shank. The head includes a plurality of adjustment teeth disposed on a body of the head. The head includes a hitch ball which is adapted to be connected to a trailer coupler. A toothed caster is adjustably engageable with the plurality of adjustment teeth disposed on the body of the head. The toothed caster includes a plurality of caster teeth which engage with the plurality of adjustment teeth disposed on the body of the head. The adjustment teeth and caster teeth are spaced at a predetermined distance so as to require proper seating of the caster teeth within the adjustment teeth for the head to be appropriately mounted to the shank portion. A mounting hole is provided in the toothed caster that is offset from the center so as to allow the toothed caster to be rotated 180 degrees to provide a second series of adjustment options.

According to yet another aspect of the present invention, the head includes an upper flange and a lower flange with the upper flange including a pair of upper flange holes that generally align with a pair of lower flange holes in the lower flange. The upper flange also includes a pair of receptor grooves on a lower surface thereof adjacent to the pair of upper flange holes. The upper and lower flange holes are provided for receipt of a pair of round spring bars while the receptor grooves on the lower surface of the upper flange are provided for receipt of the trunnion receptor of a trunnion-type spring bar. Accordingly, the head of the present invention can be utilized with either round or trunnion-type spring bars.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

Figure 1:
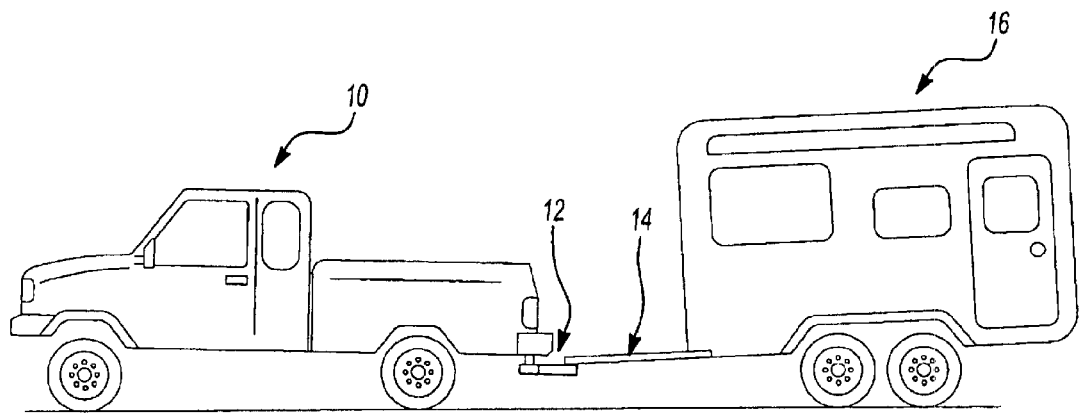
FIG. 1 illustrates a problem with the prior art trailer hitch system weighing down a rear end of a towing vehicle.

With reference to FIG. 1, the prior art trailer hitch assembly will now be described. As is very well known in the art, a towing vehicle 10 is provided with a hitch system 12 which is connected to a tongue 14 of a trailer 16. As illustrated in FIG. 1, when the trailer 16 is hitched to a towing vehicle 10, the tongue weight typically causes the rear of the tow vehicle 10 to lower and the front to raise.

Figure 2:
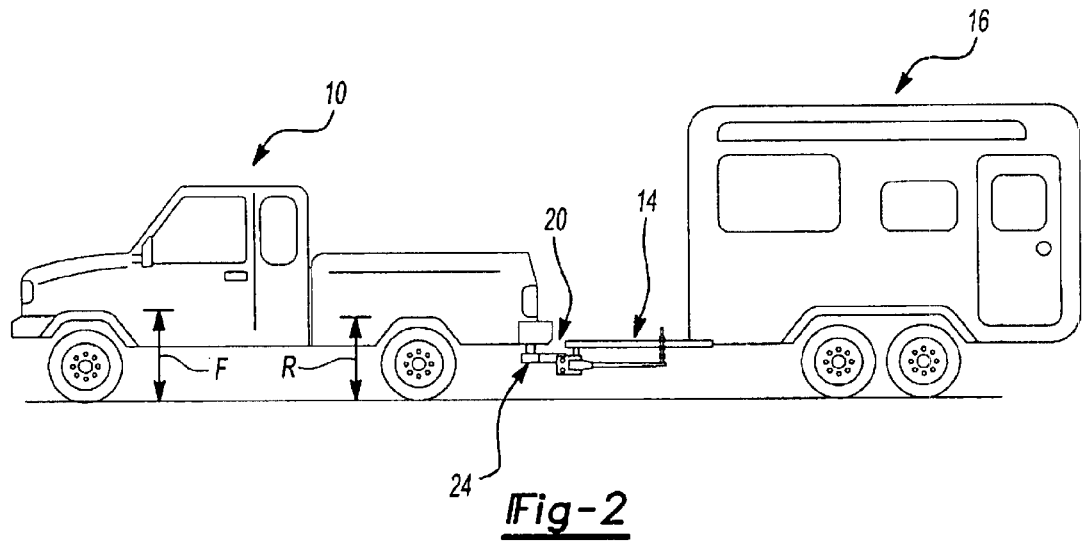
FIG. 2 illustrates a well balanced weight distribution system utilized for towing a trailer behind a towing vehicle according to the principles of the present invention.

With reference to FIG. 2, a weight distributing hitch system, according to the principles of the present invention, will now be described. As shown in FIG. 2, a towing vehicle 10 is provided for towing a trailer 16 which is provided with a tongue 14. The tongue 14 of the trailer 16 is attached to the hitch system 20 of the present invention in order to distribute some of the weight of the trailer to the front axle of the towing vehicle 10 and to the axles of the trailer 16.

Figure 3:
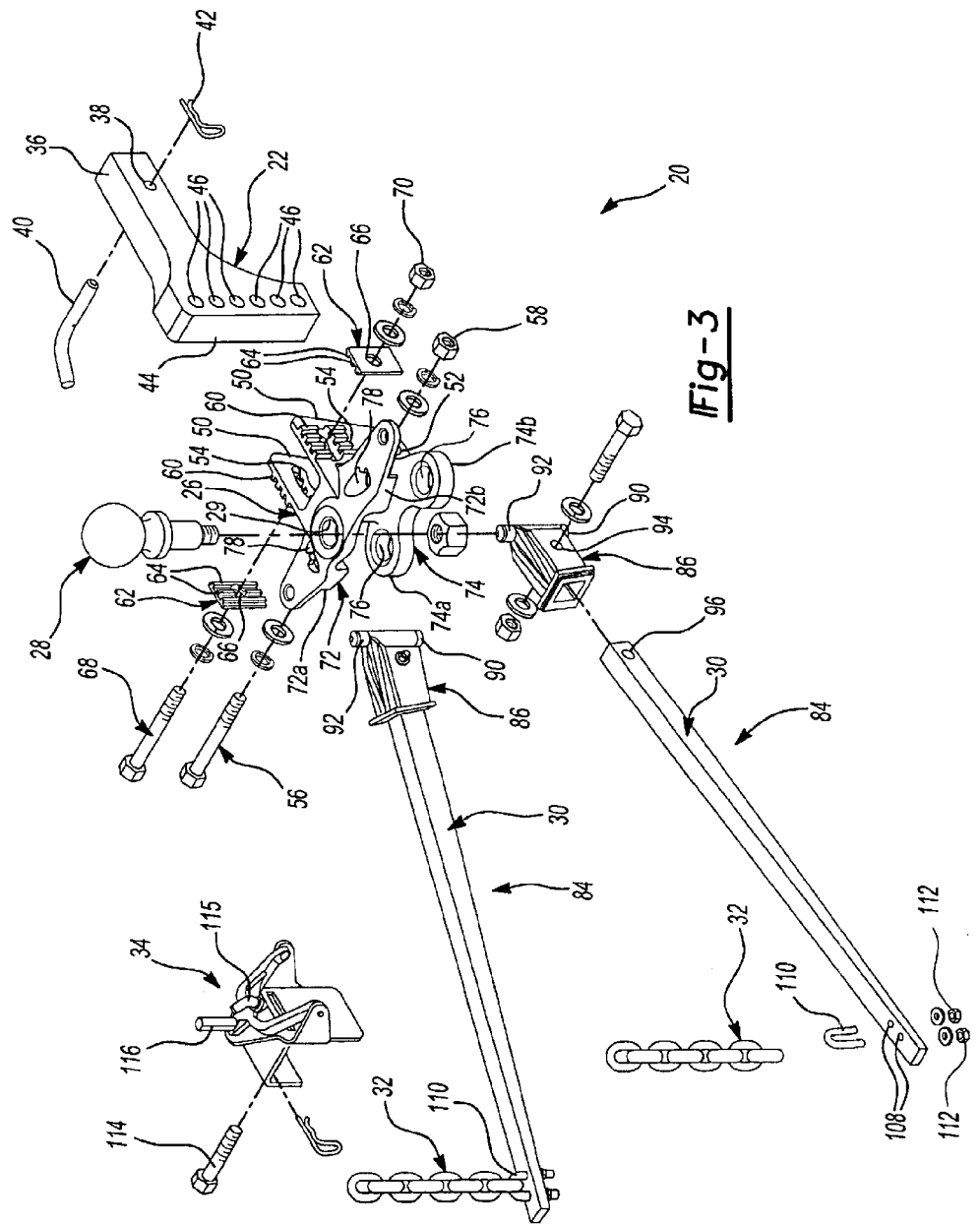
FIG. 3 is an exploded perspective view of a weight distributing hitch assembly according to the principles of the present invention for use with trunnion-type square spring bars.

As best shown in FIG. 3, the hitch system 20 of the present invention includes a shank 22 which is adapted to be connected to a hitch receptacle 24 mounted to the rear portion of the vehicle 10 as best shown in FIG. 2. A head 26 is adjustably mounted to the shank 22. A hitch ball 28 is mounted to a ball mounting hole 29 of the head 26. A pair of spring arms 30 are removably attached at a first end to the head 26. A chain 32 is attached to a second end of each of the spring bars 30 and extends vertically upward for engagement with a respective snap-up bracket 34 which is disposed on each of the arms of the "A" frame portion of the tongue 14 of the trailer 16 (only one of the snap-up brackets 34 being shown).

The shank 22 is generally L-shaped and includes a generally square or rectangular horizontal portion 36 designed to be received in a hitch receptacle 24 provided on the vehicle. A hole 38 is provided through the horizontal portion for receiving a locking pin 40 which is inserted through a corresponding hole (not shown) in the hitch receptacle 24. The locking pin 40 is secured in place by a clip 42 for securing the horizontal portion 36 of the shank 22 within the hitch receptacle 24. The shank 22 also includes a vertical portion 44 which is provided with a plurality of transversely extending holes 46 spaced along the vertical extent of the vertical portion 44 and spaced a predetermined distance from one another.

The head 26 includes a pair of spaced shank flanges 50 which are spaced apart approximately a distance equal to or greater than a width of the vertical portion 44 of shank 22. The shank flanges 50 are each provided with a lower mounting hole 52 and an arcuate shaped upper mounting slot 54. The lower mounting holes 54 are adapted to receive a first fastener such as a threaded bolt 56 which is inserted through the lower mounting holes 52 and a selected one of the holes 46 provided in the vertical portion 44 of shank 22. A nut 58 is engaged with the bolt 56 to secure the bolt in place. Appropriate washers/lock washers are utilized on the fastener 56.

Figure 7:
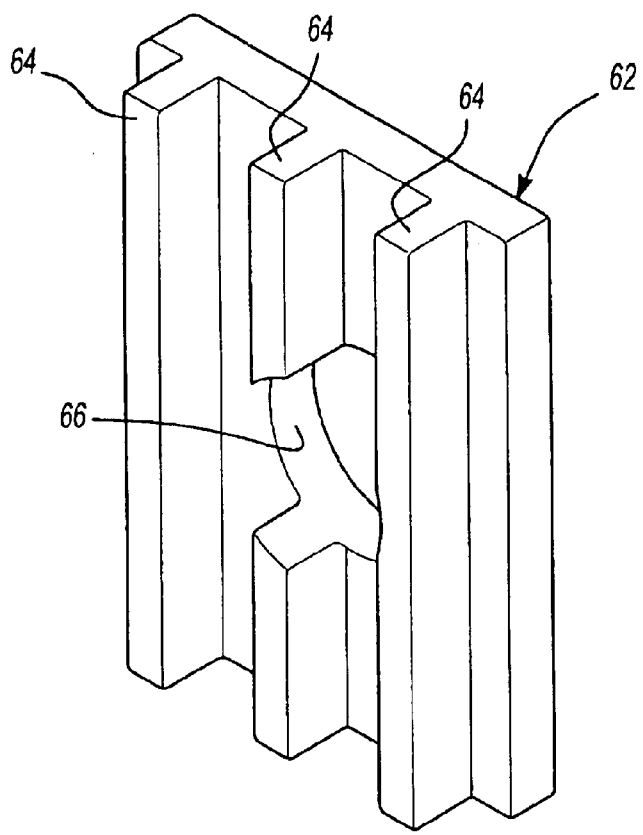
FIG. 7 is a perspective view of the toothed caster according to the principles of the present invention.
Figure 8:
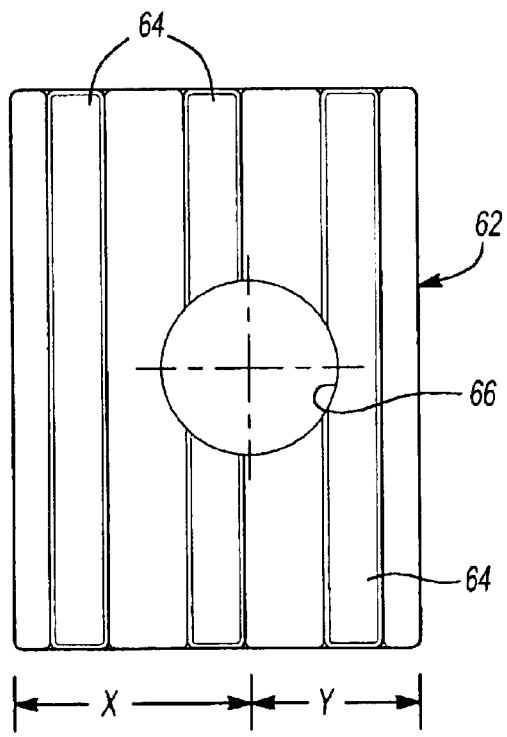
FIG. 8 is a plan view of the toothed caster shown in FIG. 7.

A plurality of adjustment teeth 60 are disposed adjacent to the upper elongated slots 54 on an outboard surface of the shank flanges 50. A pair of toothed casters 62 are provided with appropriately spaced teeth 64 (best shown in FIG. 7) which are designed for cooperative engagement with the plurality of adjustment teeth 60 on head 26. The toothed casters 62 each include a mounting hole 66 disposed offset laterally from a center portion of the tooth caster 62, as best illustrated in FIG. 8. A second fastener such as threaded bolt 68 is provided for passing through the mounting hole 66 provided in each of the toothed casters 62 and through the arcuate slot 54 provided in the shank flanges 50 of head 26. The threaded fastener 68 also passes through one of the corresponding mounting holes 46 provided in the vertical portion 44 of shank 22.

The angular position of the head 26 is adjustable relative to shank 22 by engaging the caster teeth 64 selectively with the plurality of adjustment teeth 60 on the head 26. According to a preferred embodiment, the head 26 includes four (4) adjustment teeth 60 on each side and the toothed casters 62 each include three (3) caster teeth 64. Thus, the toothed casters 62 can engage the adjustment teeth 60 in five different positions and can also be rotated 180 degrees to obtain five additional positions for a total of ten discrete angular orientations of the head achieved with relatively large teeth. A nut 70 is then secured to the bolt 68 to secure the toothed casters in engagement with the adjustment teeth 60 of the head 26. Again, appropriate washers/lock washers can be utilized with the bolt 68.

Figure 6:
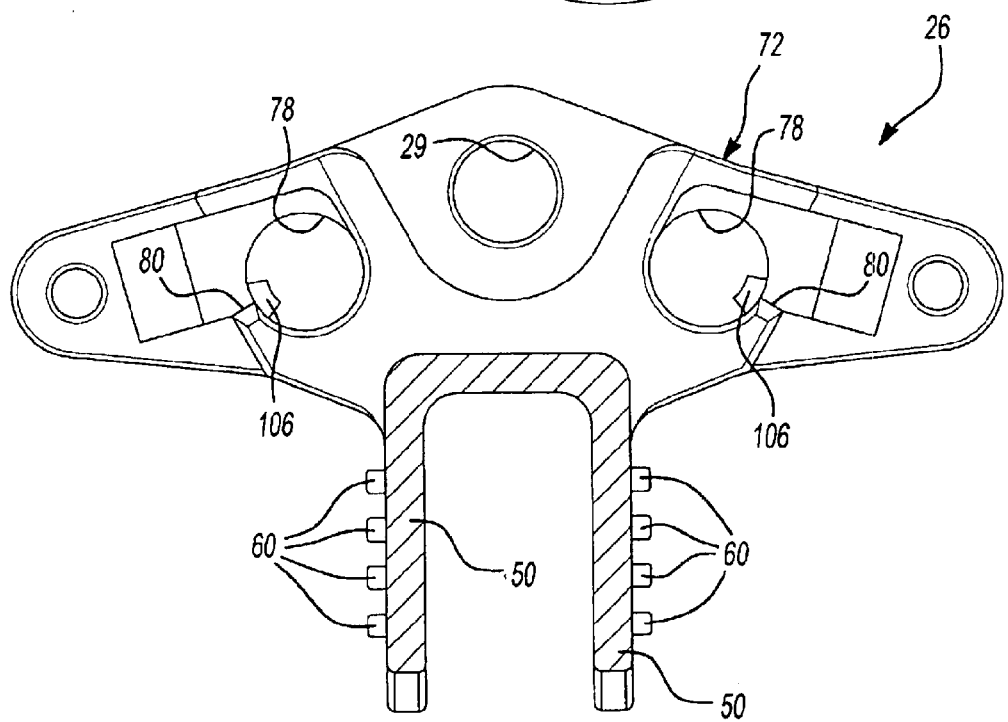
FIG. 6 is a cross-sectional view of the head looking upwards at the top flange.

The head 26 also includes a rear upper flange portion 72 and a rear lower flange portion 74. The rear lower flange portion 74 includes two ear sections 74A, 74B. The left and right ear sections 74A, 74B of the rear lower flange portion 74 each include a spring bar mounting hole 76 extending therethrough. The rear upper flange portion 72 of the head 26 includes left and right ear sections 72A, 72B which each include a mounting hole 78 extending therethrough above the mounting holes 76 of the rear lower flange portion 74. In addition, a lower surface of the rear upper flange portion 72 is provided with a pair of receptor grooves 80 best shown in FIG. 6 which each communicate with the mounting holes 78 provided in the left and right ear sections 72A, 72B of the rear upper flange portion 72.

Figure 4:
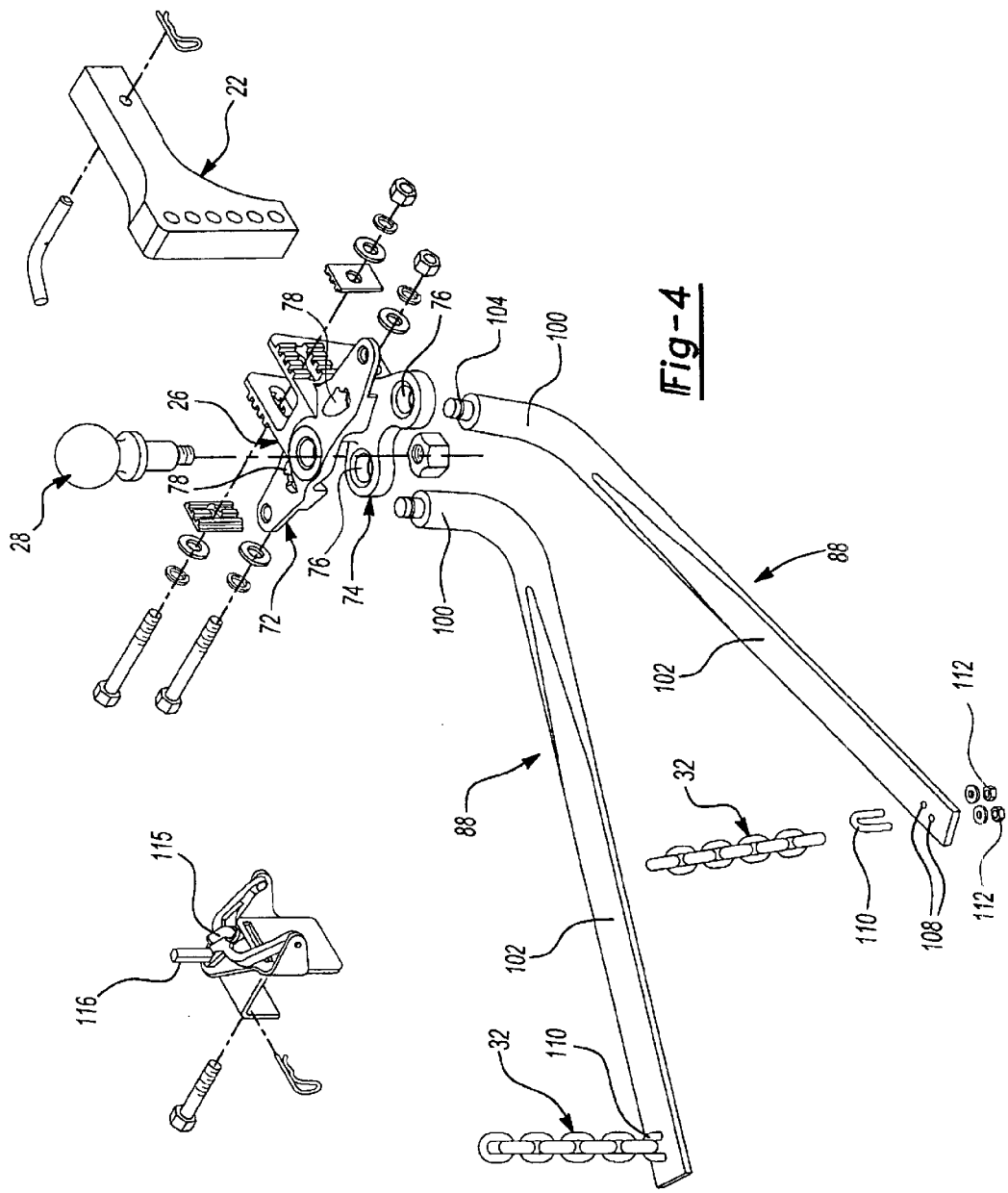
FIG. 4 is an exploded perspective view of a weight distributing hitch system according to the principles of the present invention utilizing alternative round spring bars.

The head 26, according to the principles of the present invention, is capable of receiving either trunnion bars 84 which are comprised of square or rectangular shaped spring bars 30 which are inserted into trunnion receivers 86 as shown in FIG. 3, or receiving round spring bars 88 as best shown in FIG. 4. The trunnion receivers 86 of the trunnion bars 84 are provided with a lower cylindrical journal portion 90 which is inserted into the mounting holes 76 provided in the rear lower flange portion 74 of the head 26. The trunnion receivers 86 are provided with an upper cylindrical journal portion 92 which are inserted through the recessed groove portions 80 provided on the lower surface of the rear upper flange portion 72 of the head 26. The square spring bars 30 are inserted into the trunnion receivers 86 and secured in place by a bolt which extends through mounting holes 94 provided in the trunnion receivers 86 and through a corresponding mounting hole 96 provided at the end of the spring bar 30.

Figure 5:
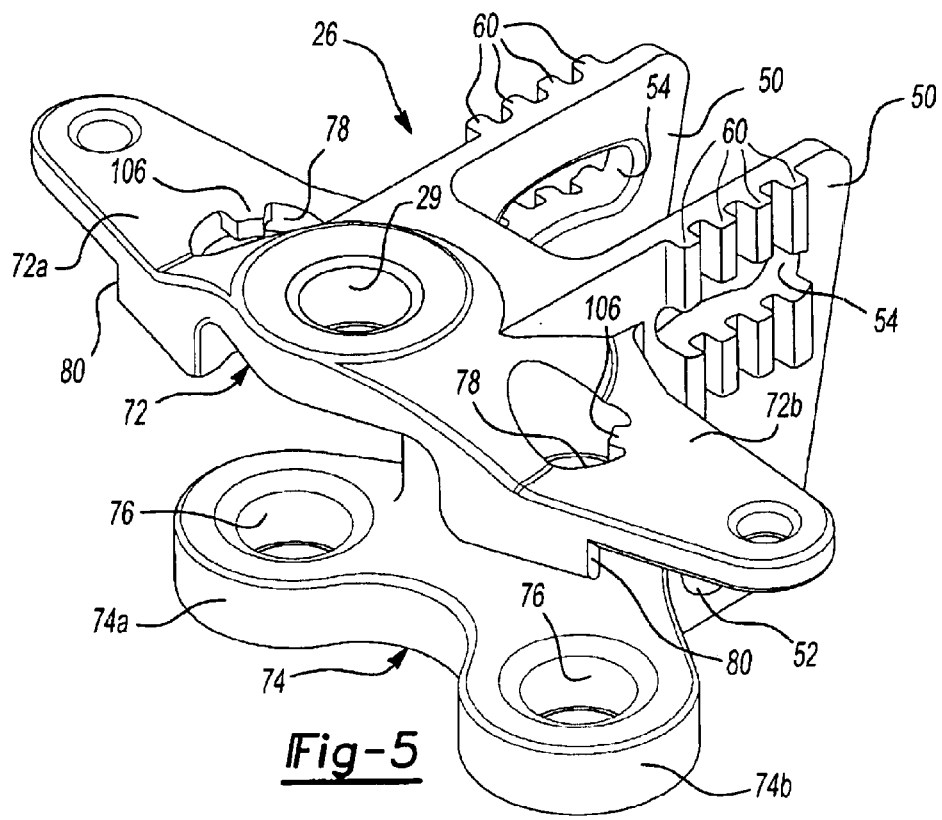
FIG. 5 is a perspective view of the head of the weight distributing hitch assembly according to the principles of the present invention.

According to an alternative embodiment utilizing round spring bars 88, as shown in FIG. 4, the round spring bars 88 are provided with upwardly extending end portions 100 and rearwardly extending elongated portions 102. The upwardly extending portions 100 are inserted upwardly through the mounting holes 76 provided in the rear lower flange portion 74 and through the mounting holes 78 provided in the rear upper flange portion 72. The upper ends of the vertical extending portions 100 of the round spring bars 88 are provided with receiving grooves 104 which are engaged by locking tabs 106 (best shown in FIGS. 5 and 6) which extend radially inwardly from the mounting holes 78 as is generally known in the art.

A rearward end of the trunnion bars 84 and round spring bars 88, include chain mounting holes 108 which are provided for receiving opposite legs 108 of a U-bolt 110 therethrough. The U-bolt 110 is secured in place by nuts 112 threadedly engaging the ends of the U-bolt 110. The chains 32 are connected at one end portion to the U-bolts 110. The chains 32 are connected at a second end portion to the snap-up brackets 34 as is known in the art.

During assembly, the shank 22 is inserted into the hitch receiver 24 and the pin 40 and clip 42 are installed. The hitch ball 28 is mounted in the ball mounting hole 29 of the head 26. The bolt holes 52 on the head 26 are then aligned to the nearest holes 46 on the shank 22 that corresponds to a ball height approximately two inches higher than the trailer coupler height, which is the height of the trailer coupler when provided in a horizontal position. The head is assembled to the shank by inserting the bolts 56 and 68 as described above, keeping the head at an angle of 90 degrees initially. The trailer coupler is then lowered onto the hitch ball, and the latch on the trailer coupler is then closed. The bottom journal 90 of the trunnion bar receiver 86 is inserted in the lower socket or mounting hole 76 of the head 26. The spring bar 30 is then tilted and then twisted so that the top journal portion 92 of the trunnion bar receiver 86 is inserted through the receptor grooves 80 into the top sockets on the underside of the upper flange portion 72 of the head 26.

The snap-up brackets 34 are positioned on the trailer A-frame of the tongue, and the chains 32 are held vertical while the snap-up brackets 34 are centered with the vertical chain. The snap-up brackets 34 are then secured in place by the fasteners 114. The trailer jack is then adjusted so that the trailer is level. The spring bar chains are then pulled straight up, and the link that is two links down from the link which is closest to the snap-up bracket will be used for the initial hook up. The trailer jack is then raised to remove all weight from the tow vehicle to raise the bumper of the tow vehicle approximately one inch. This will reduce the spring bar tension and make the chain connection safer and easier. The upper end of the chosen chain link is then attached to the snap-up bracket hook 115 while allowing the remaining chain to fall on the outside of the bracket. The handle 116 is then used to raise the snap-up bracket 34.

To adjust the angle of tilt on the head 26, the trailer is uncoupled and the top nut 70 on the upper bolt 68 is loosened so the toothed spacers 62 are free to move. The toothed spacers 62 can be slid laterally to engage adjacent teeth, or can be rotated 180 degrees in order to adjust the tilt angle of the head relative to the shank 22, as discussed above.

With the design of the present invention, the head 26 is provided with a unique angular adjustment feature which utilizes a small number of adjustment teeth on the head and toothed casters 64, but provides for ten different angular positions while utilizing a wide toothed configuration which gives greater strength and assurance of proper seating. In addition, the head 26 is capable of being utilized with both trunnion bars and round spring bars.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A weight distribution hitch system for a trailer, comprising:

a shank portion;

a head angularly adjustably connected to said shank, said head including a plurality of adjustment teeth disposed on a body of said head; and at least one toothed caster adjustably engageable with said plurality of adjustment teeth, said toothed caster defining a plurality of caster teeth and a mounting hole therethrough, said mounting hole being offset from a center position in a lateral direction.

2. The weight distribution hitch system of claim 1 wherein said shank portion has an elongated first section that is generally perpendicular to an elongated second section, said second section including a plurality of aligned holes spaced at predetermined distances.

3. The weight distribution hitch system of claim 1 wherein said head includes a first and second side wall, said first side wall separated from said second side wall by a predetermined distance for receiving said shank portion therebetween.

4. The weight distribution hitch system of claim 3 wherein said first and second side walls include a slotted hole and a pivot hole, said slotted holes being separated from said pivot holes by a predetermined distance.

5. The weight distribution system of claim 1 wherein said toothed caster includes less than four caster teeth.

* * * * *